United States Patent [19]

Gunnergaard

[11] 3,830,283

[45] Aug. 20, 1974

[54] APPARATUS FOR AUTOMATICALLY PRODUCING MOLD PARTS

[75] Inventor: Marius Gunnergaard, Lyngby, Denmark

[73] Assignee: Dansk Industri Syndikat A/S, Herlev, Denmark

[22] Filed: Sept. 19, 1972

[21] Appl. No.: 290,368

[30] Foreign Application Priority Data
Sept. 23, 1971 Denmark .......................... 4646/71

[52] U.S. Cl. ................ 164/200, 141/102, 141/248, 164/40, 164/212
[51] Int. Cl. .......................................... B22c 15/24
[58] Field of Search ............ 164/40, 200, 201, 202, 164/207, 212, 19, 20, 22, 37, 192; 141/102, 248

[56] References Cited
UNITED STATES PATENTS
2,228,595  1/1941  Finch .............................. 141/248 X
2,273,735  2/1942  Raymer .......................... 141/248 X FOREIGN PATENTS OR APPLICATIONS
69,888  11/1969  East Germany ................. 164/40
713,157  11/1941  Germany ........................... 164/201

Primary Examiner—J. Spencer Overholser
Assistant Examiner—John E. Roethel
Attorney, Agent, or Firm—Imirie and Smiley

[57] ABSTRACT

In an automatic mold part forming apparatus in which the mold parts are successively produced by pressure between a pair of opposed pattern plates or end walls in a mold chamber, the top wall of the chamber presents at least two material admitting apertures which selectively may be brought into and out of operation.

4 Claims, 2 Drawing Figures

PATENTED AUG 20 1974 3,830,283

APPARATUS FOR AUTOMATICALLY PRODUCING MOLD PARTS

BACKGROUND OF THE INVENTION

This invention relates to an automatic mold part producing apparatus comprising a mold chamber having two end walls constituted, respectively, by a pressure plate that is displaceable in the axial direction of the mold chamber and a counterpressure plate which, for preference, remains stationary during the pressing or mold part forming operation, and an apertured top wall through which sand or a similar mold part forming material may be introduced into the mold chamber from a supply bin loaded by pressurized air.

An apparatus of this type is disclosed by Jeppesen U.S. Pat. No. 3,008,199. Normally, the top wall of the mold chamber of this machine comprises a single passage aperture or injection slot that extends transversely to the pressure direction and which, for the obtention of an optimum distribution of sand inside the mold chamber, should preferably be situated more or less halfway between the counterpressure plate and the pressing plate in the inner terminal position of the latter.

The height of the patterns or semi-patterns to be placed on the pressure plate and the counterpressure plate may vary quite considerably, and, i.e., with a view to achieving a saving in the consumption of sand, it should be possible to change the thickness of the mold parts produced in accordance with the actual height of the patterns. Actually, this does not give rise to any particular difficulties since the length of stroke and/or the central point of the reciprocating movement of the pressure plate can be changed in a wellknown manner. On the other hand, it does result in difficulties to simultaneously change the location of the injection slot so that it constantly remains approximately above the centre of the chamber. One possibility is to allow the ceiling of the mold chamber to be displaceable, but such a solution is unsatisfactory because a movable top wall can cause serious difficulties with respect to sealing and also can be detrimental to the precision of the mold parts produced.

SUMMARY OF THE INVENTION

In the apparatus according to the invention, the desired relocation of the sand inlet to the mold chamber is rendered possible in that the top wall of the chamber is provided with at least two passage apertures which are spaced in the pressure direction and optionally or selectively can form communication between the supply bin and the pressing chamber. It is possible in this case to employ one of the passage apertures when producing relatively thin mold parts and the other when producing comparatively thick mold parts so that it can be ensured, whatever the circumstances, that the sand or the corresponding mold part forming material is introduced into the mold chamber reasonably close to its centre.

DETAILED DESCRIPTION OF THE INVENTION

Figure 1:
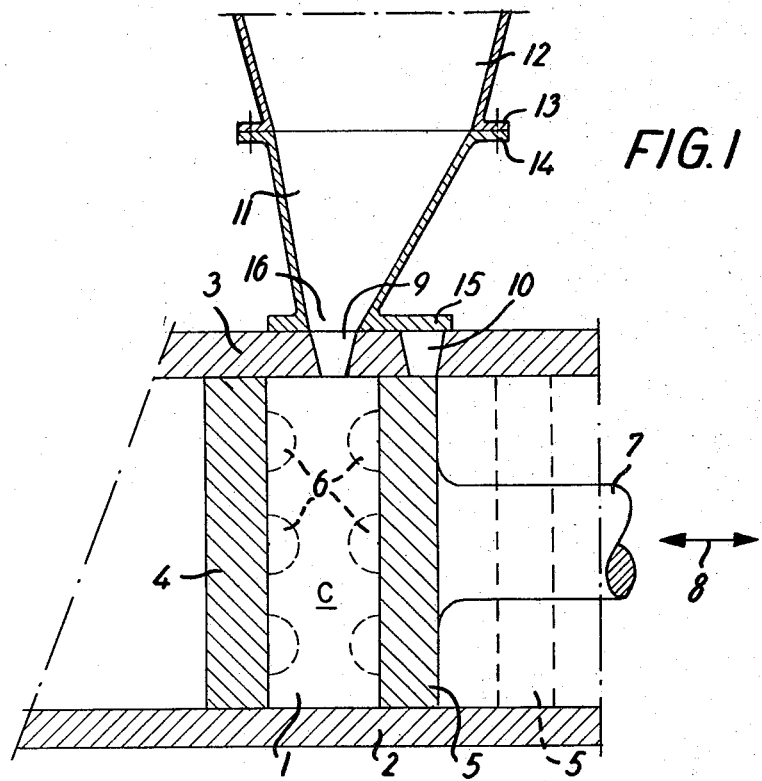
FIG. 1 is a diagrammatic sectional elevation of the relevant components of a first embodiment of apparatus according to the invention, and FIG. 2 a second embodiment, shown in a similar manner.

In FIG. 1, the mold chamber C of the apparatus comprises upstanding sidewalls 1, a bottom wall 2 and a top wall 3, as well as two end walls or pattern plates constituted by a counterpressure plate 4 and a pressure plate 5, respectively. As indicated, these end walls can carry patterns or semi-patterns 6 on the sides that face each other. By means of a piston rod 7, a reciprocating movement can be imparted to pressure plate 5, as indicated by double arrow 8. The length of stroke and/or the central point of this reciprocating movement can, as mentioned previously, be adjusted to the desired thickness of the mold parts to be produced in chamber C. In FIG. 1, pressure plate 5 is shown in full lines in its innner terminal position when producing relatively thin mold parts, while the corresponding position, when comparatively thick mold parts are produced, is shown in broken lines.

The top wall 3 of the mold chamber has two slot-like inlet apertures or injection slots 9 and 10 extending transversely to the pressure direction, but only the first one 9 is in use in the situation illustrated in full lines in the drawing. The slot 9 is connected with a funnel 11 communicating with a supply bin 12 that contains a suitable quantity of sand and which, in a manner not shown in greater detail, can be put under pressure when mold chamber C is to be filled with this material. Normally, the filling operation is carried out while pressure plate 5 assumes its right-hand or outer terminal position (not shown), so that the charged material is compressed against counterpressure plate 4 in the course of the forwardly directed stroke of pressure plate 5.

The bottom aperture of supply bin 12 is surrounded by a flange 13 which, by means of bolts or in some other way, is releasably clamped together with a top flange 14 on funnel 11. A bottom flange or bottom plate 15 of the funnel 11 fits tightly against the upper side of the top wall 3 of the mold chamber and surrounds an outlet 16 having a shape similar to that of the slot 9. As clearly seen in FIG. 1, the outlet 16 does not lie vertically below the centre of the bottom aperture of the supply bin 12. In fact, it is off-set laterally a distance corresponding to half the distance between slots 9 and 10. In the embodiment shown, the bottom plate 15 of the funnel 11 covers the unused slot 10 in the top wall 3 of the chamber. If so desired, it is also possible to close this slot by means of a matching block or plug.

When the slot 10 is to be put into use, when thicker mold parts are to be produced, the funnel 11 is disconnected from the supply bin 12 and is turned 180° in the horizontal plane, so that the outlet 16 becomes flush with the injection slot 10 while the bottom plate is covers the slot 9.

Figure 2:
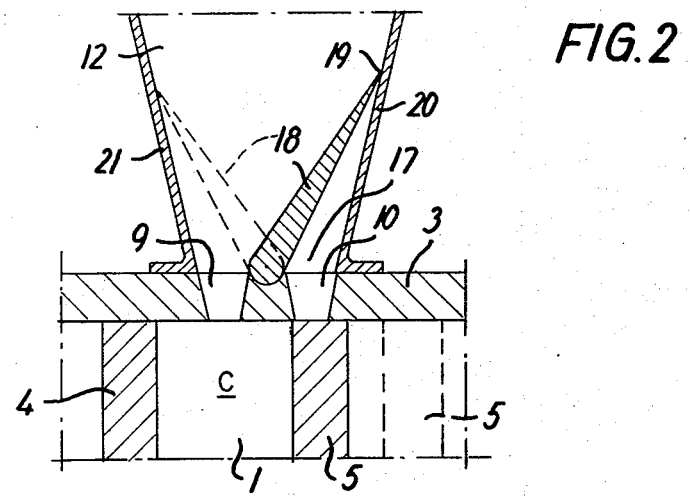

In FIG. 2, the same reference numerals are used for analogous components. In FIG. 2, the top wall 3 of the mold chamber is likewise provided with two slots 9 and 10 which extend transversely to the pressure direction and permit the filling of the mold chamber with material from the supply bin 12. In this case the supply bin is provided with a bottom aperture 17 which spans and communicates with both slots 9 and 10, and between these slots a pivotable gate 18 is supported that, with its edge portion 19, can be brought into close abutment against one or the other of the walls 20 and 21 of the supply bin which extend transversely to the pressure direction. In the position shown in full lines, the gate 18 abuts upon the rearmost wall 20 of the supply bin so that the foremost slot 9 is in use, while access from the supply bin to the other slot 10 is blocked by the gate. If desired, the slot 10 may be additionally closed by a matching block. The other terminal position of the gate is indicated in broken lines, and in this position the slot 10 is in use. It is also possible to fix gate 18 in its central position so that the material from supply bin 12 is able to pass down into the mold chamber 1 through both slots 9 and 10.

I claim:

1. A mold part forming apparatus comprising a mold part forming means defining a mold chamber and including side walls, a bottom wall, a top wall, a counterpressure end wall and a reciprocal pressure end wall opposite said counterpressure end wall, the length of said chamber between said end walls being established by the stroke of said pressure end wall, said top wall having a plurality of inlet openings for the admission of mold part forming material, said openings being spaced longitudinally of said chamber in accordance with the stroke of said pressure end wall, and mold part material supply means including discharge means for controlling the feeding of material selectively through said top wall inlet openings according to the size of the mold chamber as established by the stroke of said reciprocal pressure end wall to enable use of one opening only for supplying material to said chamber.

2. A mold part forming apparatus comprising a mold part forming means defining a mold chamber and including side walls, a bottom wall, a top wall, a counterpressure end wall and a reciprocal pressure end wall opposite said counterpressure end wall, the length of said chamber between said end walls being established by the stroke of said pressure end wall, said top wall having a plurality of inlet openings for the admission of mold part forming material, said openings being spaced longitudinally of said chamber in accordance with the stroke of said pressure end walls, and mold part material supply means including discharge means for feeding material selectively through said top wall inlet openings according to the size of the mold chamber as established by the stroke of said reciprocal pressure end wall, said material supply means having an open bottom and said discharge means comprises a funnel having a top portion movably secured to the bottom of said supply means for selective orientation relative thereto, said funnel having a discharge opening in the bottom thereof that is offset from said top portion to be selectively aligned with one only of said top wall openings.

3. An apparatus according to claim 2 wherein said discharge means comprises a flange extending from the bottom thereof to overlie and close the other of said top wall openings.

4. A mold part forming apparatus comprising a mold part forming means defining a mold chamber and including side walls, a bottom wall, a top wall, a counterpressure end wall and a reciprocal pressure end wall opposite said counterpressure end wall, the length of said chamber between said end walls being established by the stroke of said pressure end wall, said top wall having a plurality of inlet openings for the admission of mold part forming material, said openings being spaced longitudinally of said chamber in accordance with the stroke of said pressure end wall, and mold part material supply means including discharge means for feeding material selectively through said top wall inlet openings according to the size of the mold chamber as established by the stroke of said reciprocal pressure end wall, said discharge means comprising a funnel having inclined walls tapering to a bottom opening of a size and configuration to register with said top wall openings and the top wall portion between said openings, and a gate pivotally mounted in the bottom of said funnel at said top wall portion between said openings for selectively swinging between the opposite side walls of said funnel for selectively directing material to said openings.

* * * * *